United States Patent
Bar-Zeev et al.

(10) Patent No.: US 10,137,986 B1
(45) Date of Patent: Nov. 27, 2018

(54) AIRLIFT PACKAGE PROTECTION AIRBAG CONTAINER

(71) Applicant: Amazon Technologies, Inc., Seattle, WA (US)

(72) Inventors: Avi Bar-Zeev, Oakland, CA (US); Gur Kimchi, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 424 days.

(21) Appl. No.: 14/668,821

(22) Filed: Mar. 25, 2015

(51) Int. Cl.
*B65D 81/02* (2006.01)
*B64D 1/14* (2006.01)
*B64C 39/02* (2006.01)
*B65D 81/05* (2006.01)

(52) U.S. Cl.
CPC .............. *B64D 1/14* (2013.01); *B64C 39/024* (2013.01); *B65D 81/022* (2013.01); *B64C 2201/128* (2013.01); *B65D 81/052* (2013.01)

(58) Field of Classification Search
CPC .... B65D 81/03; B65D 81/052; B65D 81/022; B64D 1/14
USPC ....................... 206/522, 591, 592, 594; 383/3
See application file for complete search history.

(56) References Cited

U.S. PATENT DOCUMENTS

| | | | | |
|---|---|---|---|---|
| 2,363,249 A | * | 11/1944 | Hutchinson | B64D 1/14 206/522 |
| 2,785,775 A | * | 3/1957 | Stevinson | A62B 1/06 138/134 |
| 2,958,487 A | | 11/1960 | Fraebel | |
| 2,974,912 A | | 3/1961 | Namsick | |
| 3,921,944 A | | 11/1975 | Morrison | |
| 4,044,867 A | * | 8/1977 | Fisher | A45C 7/004 190/107 |
| 4,612,781 A | * | 9/1986 | Swerdon | B65D 81/3881 383/110 |
| 4,809,352 A | * | 2/1989 | Walker | A45C 3/00 206/522 |
| 4,826,329 A | * | 5/1989 | Bellini | A45C 7/0081 190/103 |
| 4,923,145 A | | 5/1990 | Broadhurst | |
| 5,042,663 A | * | 8/1991 | Heinrich | B65D 81/052 206/522 |

(Continued)

OTHER PUBLICATIONS

Office action for U.S. Appl. No. 14/668,729, dated Feb. 28, 2017, Bar-Zeev, "Airlift Package Protection Airbag", 12 pages.

(Continued)

*Primary Examiner* — Luan K Bui
(74) *Attorney, Agent, or Firm* — Lee & Hayes, PC (57) ABSTRACT

An airbag container may be inflated and used to protect an item placed within the airbag container. The airbag container may include an inflatable portion that includes sidewalls that extend between a cover to a base. The airbag container may include an orifice to receive gas to inflate the sidewalls, the cover, and the base to an inflation pressure. The airbag container may include an inner cavity defined within the sidewalls, the cover, and the base. The inner cavity may be unpressurized when the inflatable body is at the inflation pressure. The cover may be at least partially separable from the sidewalls to enable insertion of an item in the inner cavity. The cover may then be securable to the sidewalls to securely contain the item in the inner cavity.

17 Claims, 11 Drawing Sheets

SECTION 3B-3B

(56) References Cited

U.S. PATENT DOCUMENTS

| | | | |
|---|---|---|---|
| 5,217,131 A * | 6/1993 | Andrews | B65D 81/052 |
| | | | 206/522 |
| 5,259,574 A | 11/1993 | Carrot | |
| 5,560,568 A | 10/1996 | Schmittle | |
| 5,568,902 A | 10/1996 | Hurley, Jr. | |
| 5,944,282 A | 8/1999 | Clausnitzer et al. | |
| 6,237,875 B1 | 5/2001 | Menne et al. | |
| 6,250,467 B1 * | 6/2001 | Weder | B65D 81/052 |
| | | | 206/522 |
| 6,607,166 B1 | 8/2003 | Pichkhadze et al. | |
| 7,090,248 B2 | 8/2006 | Jenkins et al. | |
| 7,815,069 B1 * | 10/2010 | Bellofatto | B65D 81/3886 |
| | | | 190/903 |
| 8,556,290 B2 | 10/2013 | Fischer | |
| 8,888,044 B2 | 11/2014 | Mailliu et al. | |
| 8,979,023 B1 | 3/2015 | Wang | |
| 2004/0176836 A1 * | 9/2004 | Kari | A61F 2/06 |
| | | | 623/1.32 |
| 2007/0017844 A1 * | 1/2007 | Komatsu | B65D 81/052 |
| | | | 206/521 |
| 2009/0127153 A1 * | 5/2009 | Kim | B65D 81/052 |
| | | | 206/522 |
| 2015/0183566 A1 * | 7/2015 | Corvisier | B65D 81/052 |
| | | | 206/522 |
| 2016/0167793 A1 | 6/2016 | Geneste | |
| 2016/0332739 A1 | 11/2016 | Wong | |
| 2017/0011333 A1 | 1/2017 | Greiner et al. | |
| 2017/0152051 A1 | 6/2017 | Sugaya | |

OTHER PUBLICATIONS

Office Action for US Patent Application, dated Aug. 16, 2017, Bar-Zeev,"Airlift Package Protection Airbag", 12 pages.
Office action for U.S. Appl. No. 15/867,622, dated Mar. 29, 2018. Bar-Zeev, "Airlift Package Protection Airbag", 17 pages.

* cited by examiner

SECTION 4C-4C

FIG. 4C

SECTION 4B-4B

AIRLIFT PACKAGE PROTECTION AIRBAG CONTAINER

BACKGROUND

Currently, most containers that are prepared for delivery use some sort of internal packing material or "dunnage" to prevent damage to or shifting of contents of the containers during transit. Examples include use of Styrofoam, use of inflated packing pillows, and use of crumpled paper, each being inserted inside a container (e.g., a corrugated box) with the contents to be delivered.

Package delivery by an unmanned aerial vehicle (UAV) may present additional challenges and design considerations. When delivering containers with a UAV, size and weight of a containers (and items within the containers) are both considered prior to initiating the delivery. If a container is too big or too heavy, the UAV may be unable to transport it.

Another aspect of UAV operation is energy consumption. Both size and weight of a container impacts energy consumption for various reasons, such as energy required to lift a container during flight, wind resistance considerations with a large, but relatively light container, and other considerations. In addition, UAVs, like most aircraft, expend extra energy during vertical or upward-directed flight (e.g., climbing to altitude, etc.). Thus, UAVs may conserve energy if they minimize changes in altitude.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIGS. 3A-3C show an illustrative helical airbag having a continuous tubular air cavity that surrounds a package.

FIG. 7A shows the airbag prior to inflation. FIG. 7B shows the airbag after inflation.

DETAILED DESCRIPTION

This disclosure is directed to an airlift package protection (APP) airbag used to protect a package (e.g., an item or a number of items) that may be dropped from within a predetermined height range by an unmanned aerial vehicle (UAV). For example, the predetermined height range may be between 5 feet and 25 feet, depending on the size and weight of the package. In some embodiments, the APP airbag may be inflated just prior to dropping of the package from the UAV. After inflation, the APP airbag may be at least partially sealed to reduce or inhibit deflation of the APP airbag, but possibly not to completely prevent airflow from the APP airbag upon contact with the ground. For example, the APP airbag may operate similar to a stunt airbag, which releases air when impacted, thereby absorbing the impact and reducing deceleration of a person. Likewise, the APP airbag may exhaust some air upon impact with the ground, thereby reducing the magnitude of deceleration shock to a package contained inside of the APP airbag.

The APP airbag may be formed of polyethylene (or other materials having similar properties) to create a volume having an inner non-pressurized cavity to contain a package. The APP airbag may be formed as any one of a helical airbag having a continuous tubular air cavity that surrounds a package, a compartmental airbag having a plurality of air cavities that surround a package, a continuous airbag having a plurality of support structures (e.g., rods, biasing devices, etc.) that structurally couple an outer container to an inner container, and/or other similar volume structures as would be understood by those having ordinary skill. The design of the APP may be configured for quick inflation with minimal air pressure, which may enable the airbag to be filled with air from sources such as a downdraft of air produced as a byproduct of the UAV's rotors, which provide thrust and lift to sustain flight of the UAV. In various embodiments, the APP airbag may be inflated by dedicated inflation devices, such as a dedicated fan, a compressed air cartridge (e.g., a $CO_2$ cylinder, etc.).

In some embodiments, the UAV may include an APP airbag that may be inflated automatically if the UAV becomes unresponsive to controls and/or loses some or all power to rotor motors that support flight of the UAV. The APP may be preconfigured around at least some features of the UAV to minimize damage of the UAV and/or of another object in the event that the UAV contacts an object, a building, and/or the ground.

The techniques and systems described herein may be implemented in a number of ways. Example implementations are provided below with reference to the following figures.

Figure 1:
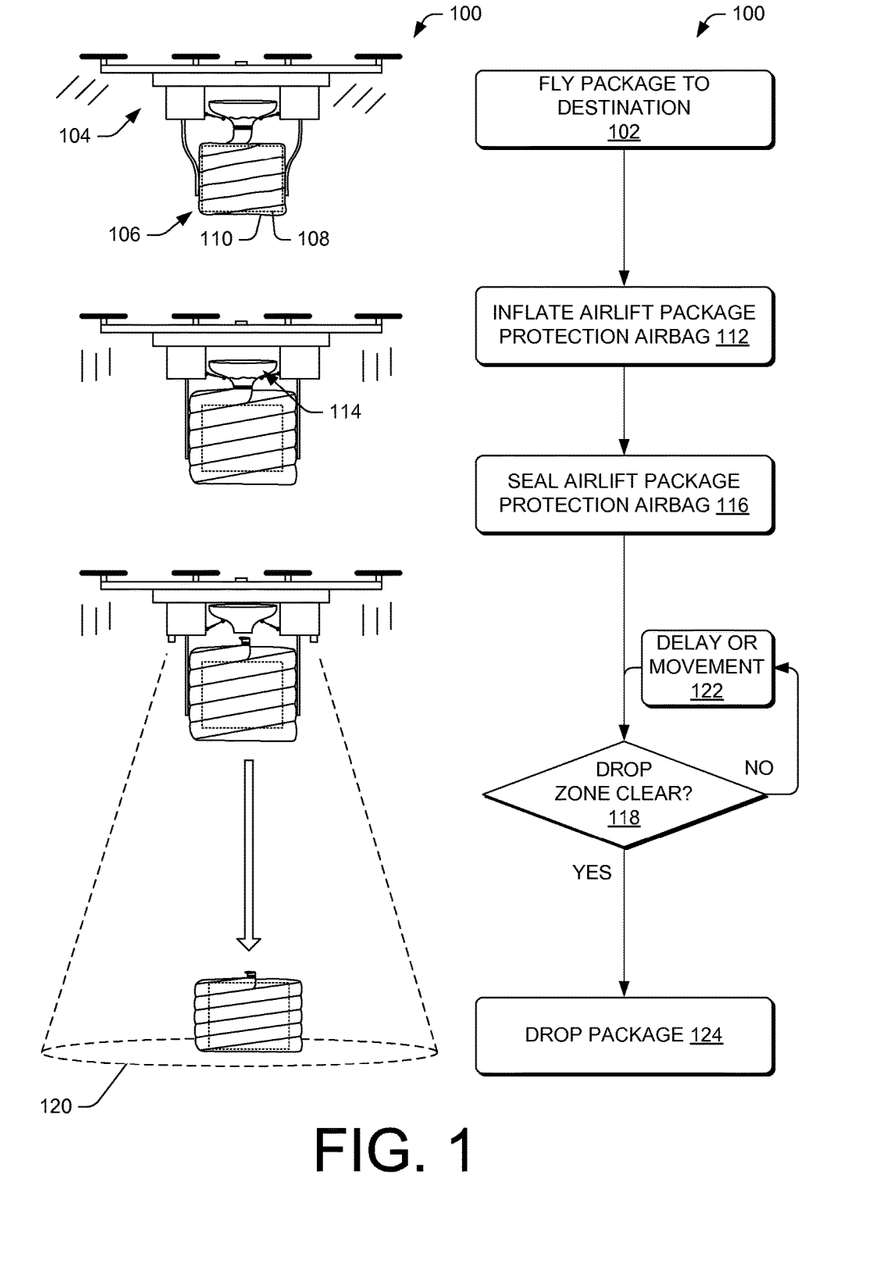
FIG. 1 is a pictorial flow diagram of a process to deliver a package, equipped with an airlift package protection airbag, to a destination with an unmanned aerial vehicle (UAV), inflate the airbag, and then drop the package from within a predetermined height range.

FIG. 1 is a pictorial flow diagram of a process 100 to deliver a package, equipped with an airlift package protection airbag, to a destination with a UAV, to inflate the airlift package protection airbag, and then to drop the package from within a predetermined height range.

At 102, a UAV 104 may transport cargo 106 by air travel to a destination. The cargo 106 may include a package 108 that is at least partially covered in an airlift package protection (APP) airbag 110. The package 108 may be an item, multiple items, or a container that contains one or more items. For example, the package may be an item wrapped in retail packaging, a bag of groceries, a bouquet of flowers, and/or other items that may or may not be contained in a bag, box, or other container. The APP airbag 110 may be fully inflated, fully deflated, or partially inflated during at least part of the transit by air travel. For example, the package 108 may be inserted, wrapped, or otherwise configured within the APP airbag 110 at a fulfillment center. The UAV 104 may then couple to the cargo 106 (the package 108 with the APP airbag 110), such as by grabbing the cargo 106 with grippers, securing to coupling features on the APP airbag, loading the cargo 106 into a cargo bay of the UAV 104, and/or otherwise coupling to the cargo 106.

At 112, the UAV 104 may inflate the APP airbag 110 during transit to the destination and/or while hovering above or near a drop location, such as a backyard or patio of a residential dwelling that is a destination for the package. The UAV 104 may inflate the APP airbag by causing an inflation mechanism 114 to provide airflow into the APP airbag 110. In some embodiments, the airflow may be a downdraft caused by propulsion units (e.g., rotors, etc.) that support flight by the UAV by creating downward thrust. In various embodiments, the UAV 104 may cause a dedicated inflation device to fill the APP airbag with a gas, such as with air, $CO_2$, or other gases. In accordance with one or more embodiments, the APP airbag 110 may be at least partially filled with air prior to transport by the UAV, such as by filling the APP airbag 110 with air at the fulfillment center.

At 116, the UAV 104 may at least partially seal the APP airbag 110 to restrict or inhibit airflow from the APP airbag 110. The APP airbag 110 may be sealed using a heat sealer that melts or otherwise fuses together portions of a material used to form the APP airbag, such as polyethylene. The APP airbag 110 may be sealed using an adhesive, such as an adhesive tape or fluid adhesive (e.g., glue), by pressure caused by a rubber band or other elastic constriction band, or by other devices that cause at least partial closure of a filling orifice of the APP airbag 110.

At 118, the UAV 104 may determine whether a drop zone 120 is clear of certain objects, such as people, animals, fragile objects, and so forth. For example, the UAV 104 may use cameras, proximity sensors, and/or other image sensors to survey the drop zone 120. The size of the drop zone may be determined by the height of the UAV 104 from the ground. The determination may also include detecting movement of objects outside of the drop zone, but near the drop zone. For example, the detection may determine whether a living being (e.g., a person or an animal) is moving toward the drop zone at a speed which may cause the living being to enter the drop zone 120 between a time of a release of the cargo 106 and the cargo 106 landing in the drop zone 120. When the drop zone is determined not to be clear (i.e., following the route "no" from the decision operation 118), then the process 100 may proceed to an operation 122. At 122, the UAV 104 may implement a delay to allow a moving object to pass through the drop zone or may move to another location (down, side to side, etc.) to possibly relocate or resize the drop zone to identify a clear drop zone. The operation 122 may then follow another instance of the decision operation 118.

When the drop zone 120 is determined to be clear (following the route "yes" from the decision operation 118), then the process 100 may proceed to an operation 124. At 124, the UAV 104 may drop the cargo 106, which includes the package 108 at least partially surrounded by the APP airbag 110. Upon impact with the ground with the drop zone 120, the APP 110 may at least slightly deflate, thereby reducing a deceleration of the package 108 and preventing damage to the package 108. In some embodiments, the drop zone 120 may not be directly below the UAV 104. In some embodiments, the UAV 104 may be configured to cause the cargo 106 move partially horizontally after detaching the cargo from the UAV 104 in order to cause the cargo 106 to land at the drop zone 120, such as when the drop zone is an elevated balcony of a tall building.

Figure 2A:
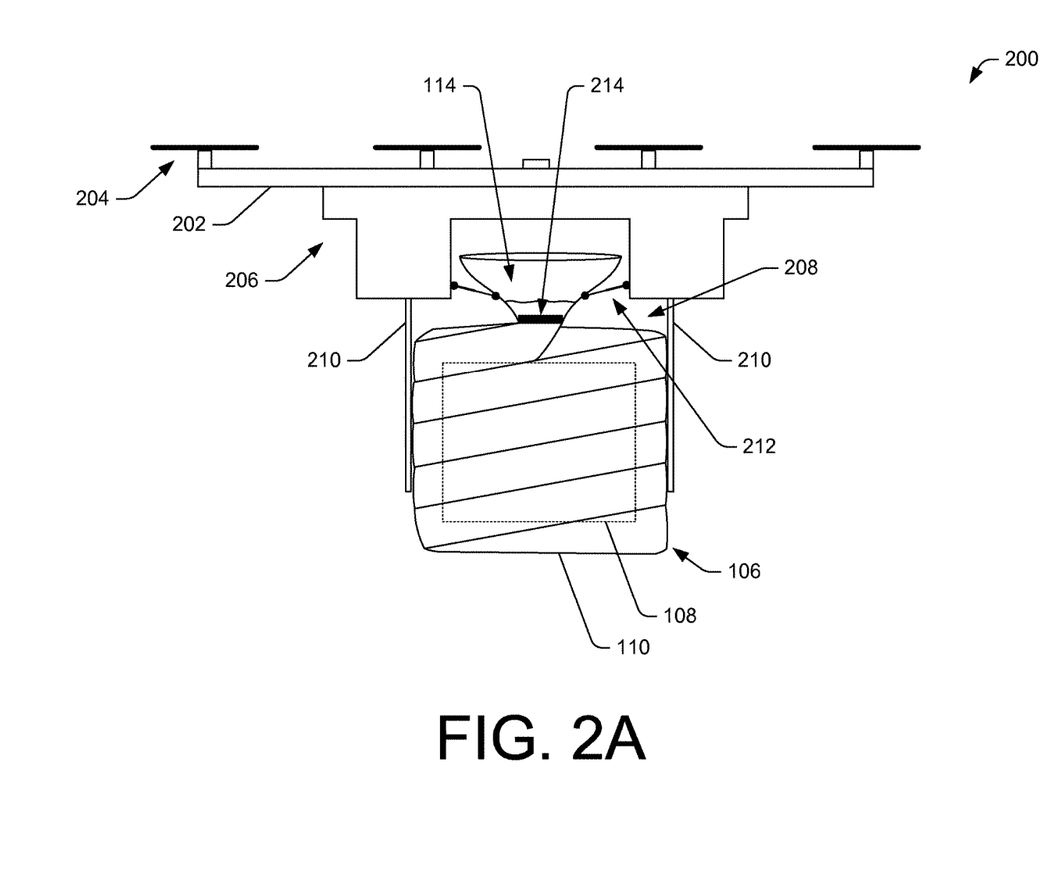
FIG. 2A is a side elevation view of an illustrative UAV that transports an inflatable airlift package protection airbag.

FIG. 2A is a side elevation view of an illustrative UAV 200 that transports an inflatable APP airbag, shown as inflated. The UAV 200 may include a chassis 202 (or airframe) configured to support propulsion units 204. In some embodiments, the propulsion units 204 may include rotors to provide thrust and lift to sustain flight of the UAV 200. The rotors may be driven by one or more electric motors or other drive mechanisms.

The UAV 200 may include a body 206, which may contain control systems (discussed below with reference to FIG. 8), among other possible components. The UAV 200 may also include a cargo bay 208, which may be configured to accommodate placement or suspension of the cargo 106. For example, the cargo 106 may hang in the cargo bay 208, which may enable inflation of the APP airbag 110 with less air pressure than if the cargo 106 were resting on a surface of the UAV 104. The cargo 106 may include the package 108 that is at least partially surrounded by the APP airbag 110. The cargo 106 may be secured by securing mechanisms 210 (e.g., movable arms, tie-downs, electrostatic grippers, and/or other securing mechanisms), which may be used to secure the cargo 106 during at least part of the flight of the UAV 200, and then unsecured to enable release (dropping) of the package 108 at a destination. The securing mechanisms 210 may accommodate a change in the size of the cargo 106 due to inflation of the APP airbag 110. For example, the securing mechanisms 210 may be elastic or partially elastic, may be biased by springs or other biasing devices, and/or may be mechanically movable to accommodate changes in the size of the cargo 106. In some embodiments, the securing mechanisms 210 may project through apertures or gaps in the APP airbag 110 to enable contact with the package 108, and thus couple to the package 108 rather than to the APP airbag 110. In such a configuration, the APP airbag 110 may be inflated without interference from the securing mechanisms 210, which may later release or be released to drop the package 110 above a destination.

The UAV 200 and/or the cargo 106 may include the inflation mechanism 114 to provide airflow into the APP airbag 110. In some embodiments, the airflow may be a downdraft caused by at least one of the propulsion units 204, which is shown in greater detail in FIG. 2B. The inflation mechanism 114 may be supported by movable supports 212, which may relocate at least part of the inflation mechanism 114 to another location (such as under a rotor of the UAV), to inflate the APP airbag 110. In various embodiments, the inflation mechanism 114 may include a dedicated inflation device to fill the APP airbag 110 with a gas, such as with air, $CO_2$, or other gases, which is shown in greater detail in FIG. 2C. For example, the inflation mechanism 114 may include a dedicated fan or a CO2 cylinder used to inflate the APP airbag 110.

The UAV 104 and/or the cargo 106 may include a sealing mechanism 214 to at least partially seal or close a filling orifice of the APP airbag 110. The sealing mechanism 214 may use a heat sealer, an adhesive (e.g., glue, tape, etc.), an elastic constriction band (e.g., a rubber band, etc.), and/or other sealing mechanisms to at least partially close the filling orifice of the APP airbag 110. In some embodiments, the sealing mechanism may include a clamp to clamp at least a portion of the APP airbag 110, thereby compressing the portion and causing the gas (e.g., air) from within the portion to be relocated to another portion of the APP airbag 110. By clamping the portion of the airbag, the remaining portion of the APP airbag 110 may experience a higher pressurization and/or may receive more gas. After the clamping, the sealing mechanism may seal the APP airbag 110, excluding the clamped portion, to maintain the air in the remaining portion of the APP airbag 110.

Figure 2B:
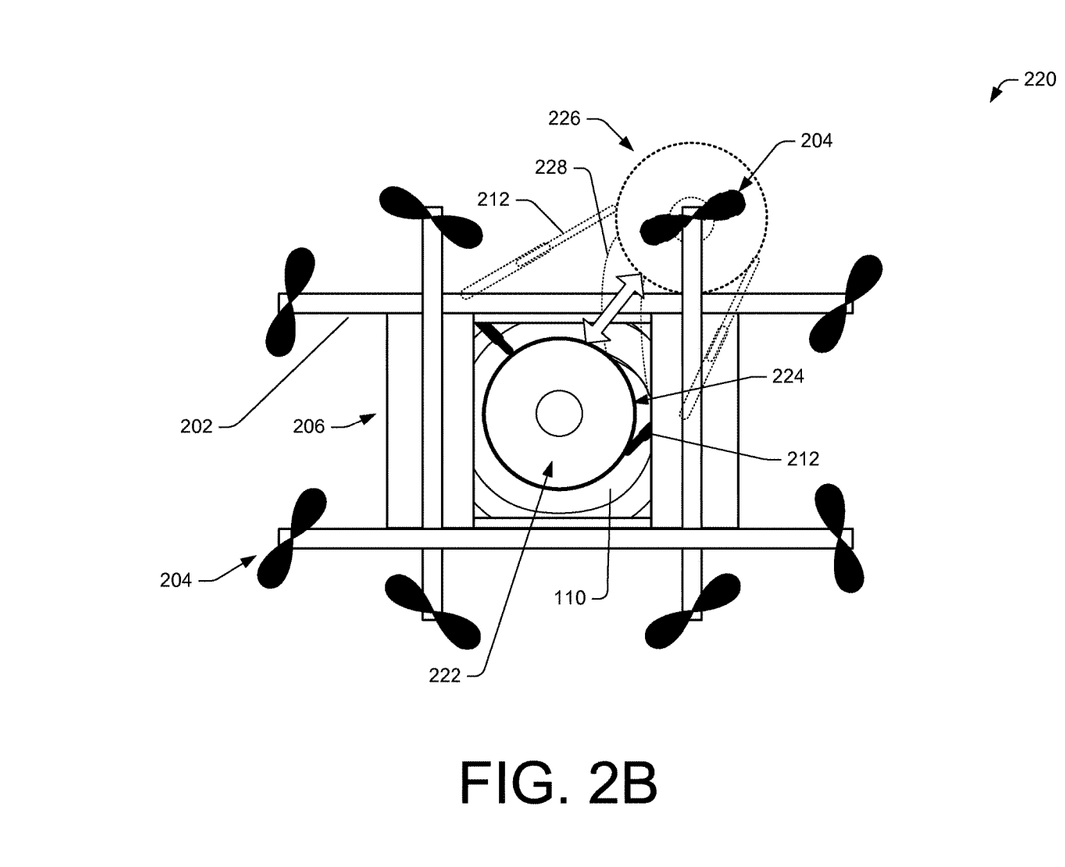
FIG. 2B is a top plan view of an illustrative UAV configured with a movable inflation mechanism configured to inflate the airlift package protection airbag during flight.

FIG. 2B is a top plan view of an illustrative UAV 220 configured with a movable inflation mechanism 222 configured to inflate the APP airbag during flight. The moveable inflation mechanism 222 may be moved by moveable supports 212 between a stowed position 224 and an inflation position 226. The moveable supports 212 may, for example, rotate and/or extend in length to move the moveable inflation mechanism 22. The inflation position 226 may be proximate to a propulsion unit 204 to enable the moveable inflation mechanism 222 to capture downdraft generated from thrust by the propulsion unit 204. The downdraft airflow may travel through an extended neck 228 of the airbag (which may be coupled to the moveable inflation mechanism) to fill the APP airbag 110 with air. When the moveable inflation mechanism 222 is moved into the stowed position 224, the moveable inflation mechanism 222 may be stowed for later use to reduce drag or reduction in other flight handling characteristics.

Figure 2C:
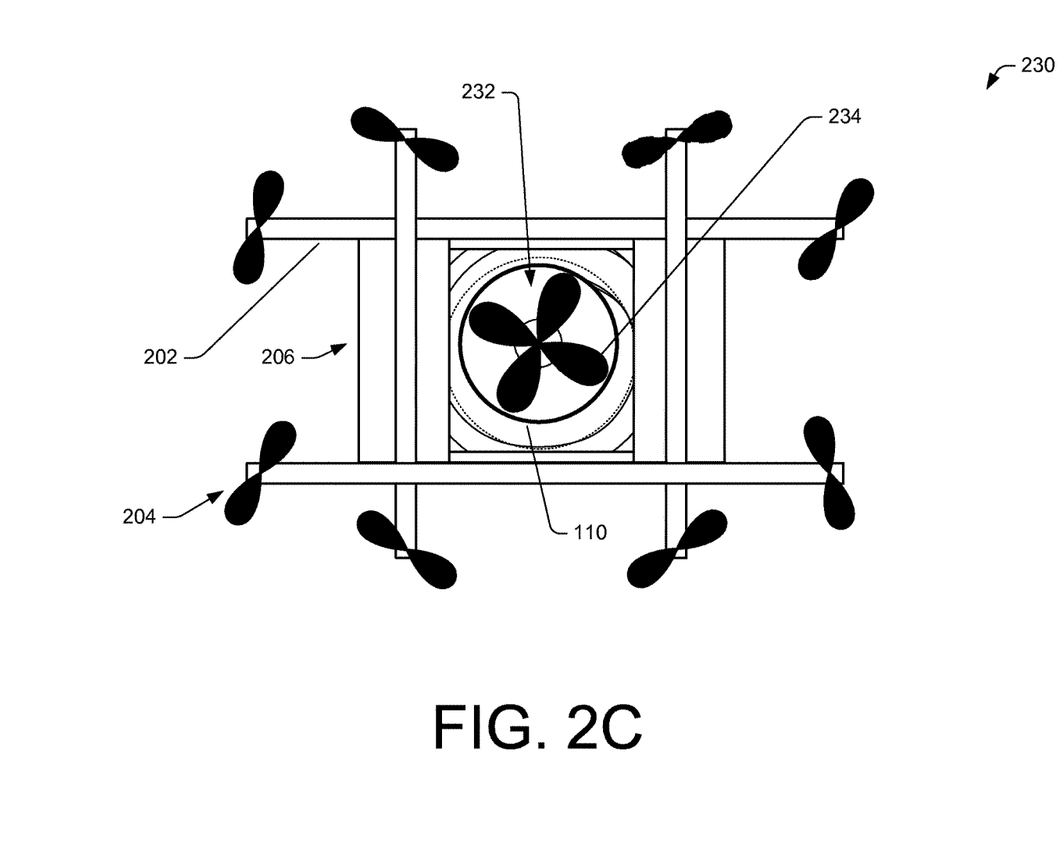
FIG. 2C is a top plan view of an illustrative UAV configured with a dedicated inflation device configured to inflate airlift package protection airbag during flight.

FIG. 2C is a top plan view of an illustrative UAV 230 configured with a dedicated inflation device 232 configured to inflate the APP airbag during flight. The dedicated inflation device 232 may include a fan 234 driven by a motor. The fan 232, when operated, may inflate the APP airbag 110 with air. However, the dedicated inflation device 232 may use other devices/techniques to inflate the APP airbag 110, as discussed herein and shown in FIGS. 6A-6C.

Figure 3A:
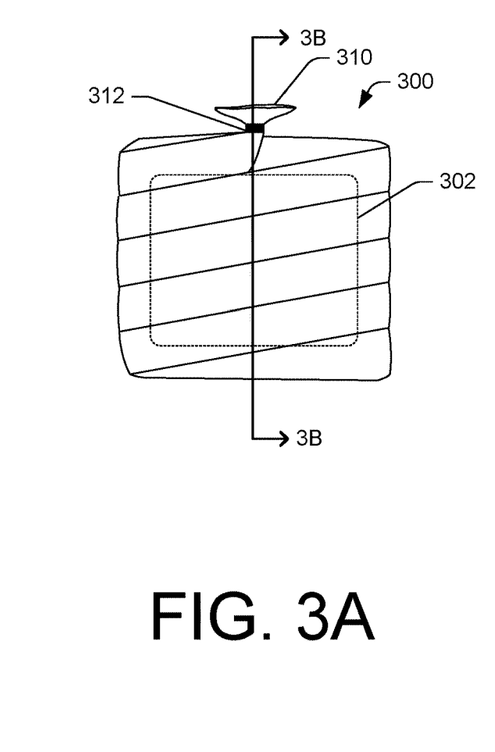
FIG. 3A is a side elevation view of the illustrative helical airbag.
Figure 3B:
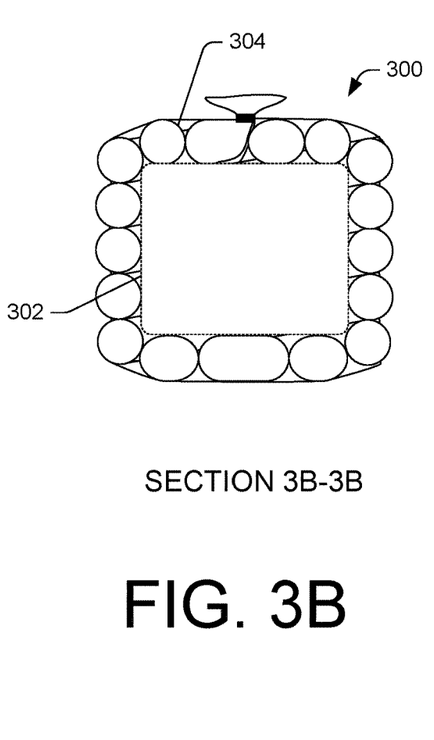
FIG. 3B is a cross-sectional side elevation view along line 3B-3B of the helical airbag shown in FIG. 3A.
Figure 3C:
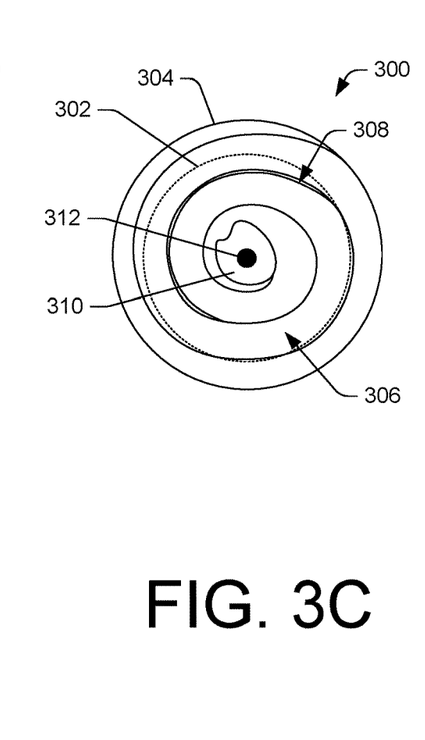
FIG. 3C is a top plan view of the illustrative helical airbag.

FIGS. 3A-3C show an illustrative helical APP airbag 300 having a continuous tubular air cavity that surrounds a package. The helical APP airbag 300 is shown as inflated with a gas, such as air. FIG. 3A is a side elevation view of the helical APP airbag 300. The helical APP airbag 300 includes an inner cavity 302 which is configured to secure or contain a package, such as the package 108 discussed with reference to FIG. 1. The inner cavity 302 may be defined by walls of an elongated tube 304 that form the helical APP airbag, as shown in FIG. 3B. FIG. 3B is a cross-sectional side elevation view of the helical APP airbag 300 along section lines 3B-3B shown in FIG. 3A. The elongated tube 304 may be a pressure vessel configured to receive air from a filling orifice and maintain the air, at least temporarily based on design requirements.

The helical APP airbag 300 may be formed by wrapping the elongated tube 304 around a package, which may result in formation of a helical structure that covers sides of the package, as shown in FIGS. 3A-3C. However, embodiments of the helical APP airbag 300 may be manufactured with the helical shape, and thus not require any actual warping of the elongated tube 304 by a worker in a fulfillment center. Instead, a deflated helical APP airbag 300 may appear more like a conventional bag or container where adjacent portions of the elongated tube 304 are coupled (joined, integrally formed, adhered, etc.) to one another to create a continuous structure having the helical shape. As shown in FIG. 3C, a portion of the elongated tub 304 may be coiled to create at least a portion of a base 306 (e.g., top, bottom, or both) for the helical structure. FIG. 3C is a top plan view of the illustrative helical airbag 300. A top of the helical APP airbag 300 may include a flap 308, or other feature to enable insertion of the package into the inner cavity 302 without puncturing the helical APP airbag. Once the package is stowed inside the helical APP airbag 300, the flap 308 and a surface of the adjacent portion of the airbag may be coupled by hook and loop closures, adhesive, tap, and/or any other coupling feature.

As shown in both FIGS. 3A and 3B, the helical APP airbag 300 may include a filling orifice 310, which may be closed by the sealing feature 310. The sealing feature 312 may be a seal created by use a heat sealer (e.g., resulting in melted polyethylene, etc.), an adhesive (e.g., glue, tape, etc.), an elastic constriction band (e.g., a rubber band, etc.), and/or other sealing features to at least partially close the filling orifice of the helical APP airbag 300.

The helical APP airbag 300, during inflation, may enable air to flow through the elongated tub 304 to fill the elongated tube with air (or any other gas). The diameter of the elongated tube may be based on the size and weight of a package to be placed in the inner cavity 302 and a maximum distance the package is expected to be dropped. For example, the diameter of the elongated tube 304 may be between 2 inches and 6 inches in some embodiments; however, other diameters may also be used. The helical APP airbag 300 may, upon impact, cause air near a side of the impact to move to another portion of the elongated tube, thereby absorbing some of the impact of the ground and reducing deceleration of the package contained in the inner cavity 302. In some embodiments, the helical APP airbag 300 may bulge upon impact and/or release air through the filling orifice 310 and/or other apertures to increase absorption of the energy caused by impacting the ground, similar to the way a stunt airbag dissipates energy when a person lands on it.

Figure 4A:
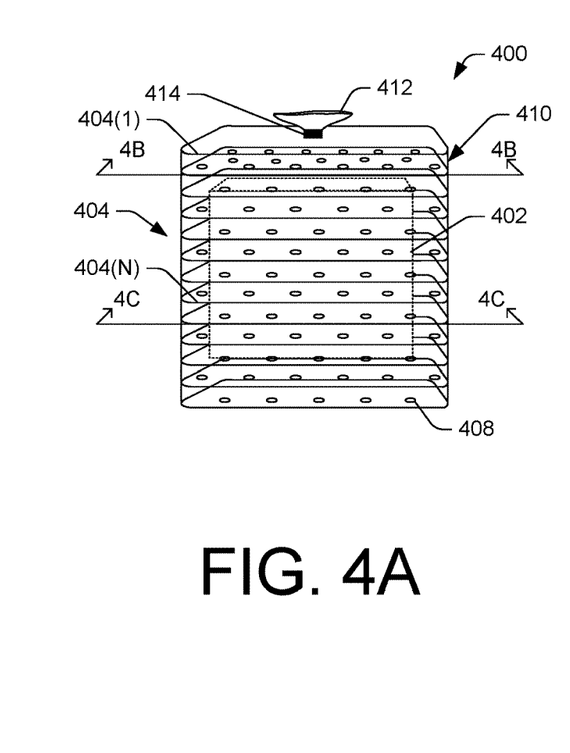
FIG. 4A is an isometric view of an illustrative compartmental airbag having a plurality of air cavities that surround a package.
Figure 4B:
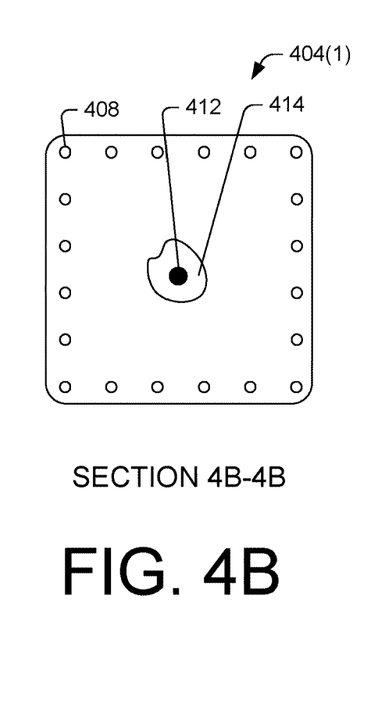
FIG. 4B is a cross-sectional bottom plan view along line 4B-4B of one of the compartments of the illustrative compartmental airbag shown in FIG. 4A.
Figure 4C:
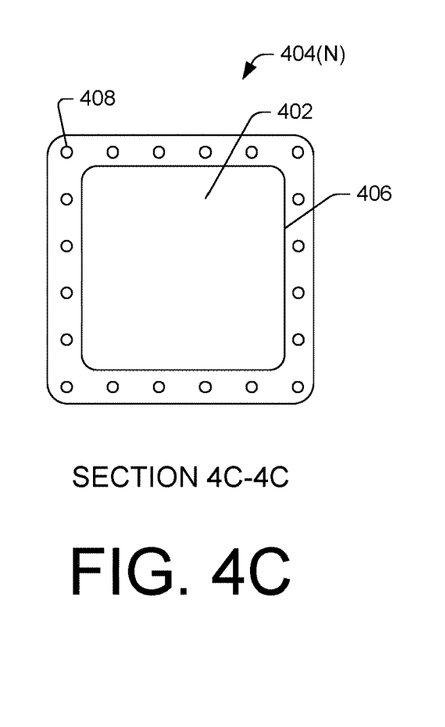
FIG. 4C is a cross-sectional bottom plan view along line 4C-4C of another one of the compartments of the illustrative compartmental APP airbag shown in FIG. 4A.

FIG. 4A is an isometric view of an illustrative compartmental airbag 400 having a plurality of air cavities that surround a package. The compartmental APP airbag 400 is shown as inflated with a gas, such as air. The compartmental APP airbag 400 includes an inner cavity 402 which is configured to secure or contain a package, such as the package 108 discussed with reference to FIG. 1. The inner cavity 402 may be defined by inner surfaces of each of a plurality of compartments 404 that form the compartmental APP airbag 400. The plurality of compartments, collectively, may form a pressure vessel configured to receive air from a filling orifice and maintain the air, at least temporarily based on design requirements. FIG. 4B is a cross-sectional bottom plan view of one of the compartments 404(1) of the illustrative compartmental APP airbag 400 along section line 4B-4B shown in FIG. 4A. FIG. 4C is a cross-sectional bottom plan view of another one of the compartments 404(N) of the illustrative compartmental APP airbag 400 along section line 4C-4C shown in FIG. 4A. The compartmental APP airbag 400 may be formed by stacking individual ones of the compartments 404. Some of the compartments 404 may include an interior surface 406 that creates the inner cavity 402, as shown in FIG. 4C.

In some embodiments, the compartments 404 may include apertures 408 that enable airflow between the various adjacent compartments 404. The apertures 408 may be offset from one another for adjacent ones of the compartments 404, thereby causing turbulent airflow within the compartmental APP airbag 400 and reducing a speed at which the compartmental APP airbag 400 can be deflated.

In use, the compartmental APP airbag 400 may operate more like a conventional bag or container where adjacent ones of the compartments 400 are coupled (joined, integrally formed, adhered, etc.) to one another to create a continuous structure having the cavity 402. A top of the compartmental APP airbag 400 may include a flap 410, or other feature to enable insertion of the package into the inner cavity 302 without puncturing the compartmental APP airbag 400. For example, the compartment 404(1) may separate from an adjacent compartment to enable insertion of the package. Once the package is stowed inside the compartmental APP airbag 400, the flap 410 (e.g., the compartment 400(1)) and a surface of the adjacent compartment may be coupled by hook and loop closures, adhesive, tap, and/or any other coupling feature.

As shown in both FIGS. 4A and 4B, the compartmental APP airbag 400 may include a filling orifice 412, which may be closed by the sealing feature 414. The sealing feature 414 may be a seal created by use a heat sealer (e.g., resulting in melted polyethylene, etc.), an adhesive (e.g., glue, tape, etc.), an elastic constriction band (e.g., a rubber band, etc.), and/or other sealing features to at least partially close the filling orifice of the compartmental APP airbag 400.

The compartmental APP airbag 400, during inflation, may enable air (or any other gas) to flow through the compartments 404 via the apertures 408. The thickness of the compartments 404 may be based on the size and weight of a package to be placed in the inner cavity 402 and a maximum distance the package is expected to be dropped. In some embodiments, multiple compartments may be used to form a top or bottom of the compartmental APP airbag 400. The compartmental APP airbag 400 may, upon impact, cause air near a side of the impact to move to another portion of the compartmental APP airbag 400, thereby absorbing some of the impact of the ground and reducing deceleration of the package contained in the inner cavity 402. In some embodiments, the compartmental APP airbag 400 may bulge upon impact and/or release air through the filling orifice 412 and/or other apertures to increase absorption of the energy caused by impacting the ground, similar to the way a stunt airbag dissipates energy when a person lands on it.

Although the compartments 404 are shown as being stacked horizontally to form layers of the compartmental APP airbag 400, other arrangements using compartments with apertures to provide airflow between adjacent compartments may also be implemented without departing from the scope of the disclosure. For example, the compartments may be arranged as cubes, vertically, diagonally, and in different sizes to create the compartmental APP airbag 400

Figure 5A:
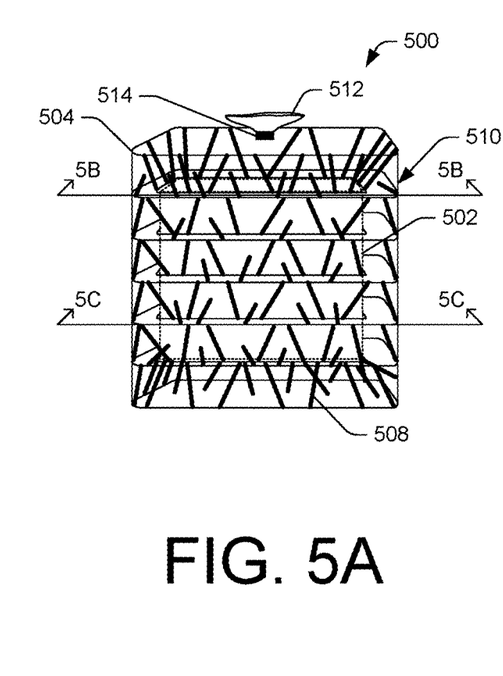
FIG. 5A is an isometric view of an illustrative continuous airbag having a plurality of support structures that structurally couple an outer container to an inner container.
Figure 5B:
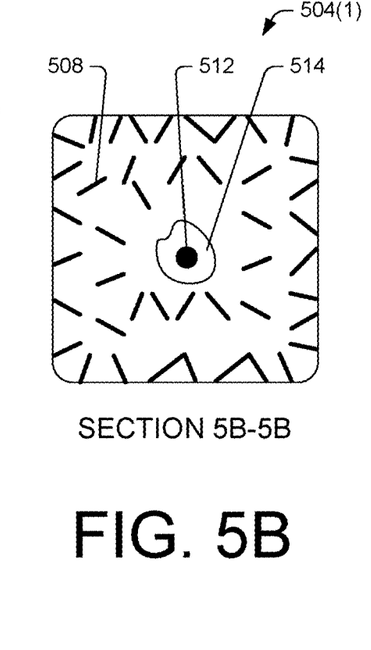
FIG. 5B is a first cross-sectional bottom plan view along line 5B-5B of the illustrative continuous airbag shown in FIG. 5A.
Figure 5C:
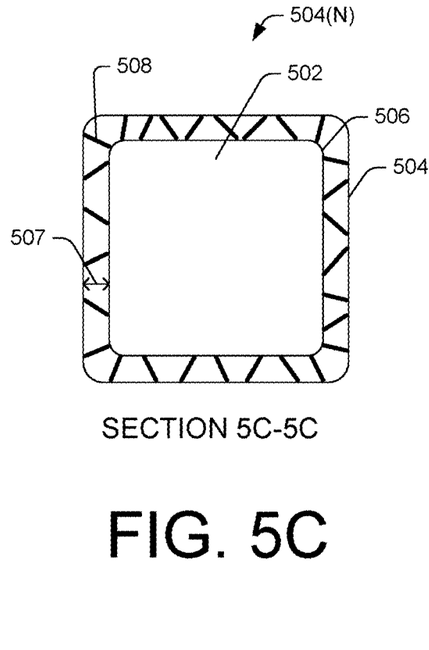
FIG. 5C is a second cross-sectional bottom plan view along line 5C-5C of the illustrative continuous airbag shown in FIG. 5A.

FIG. 5A is an isometric view of an illustrative APP continuous airbag 500 having a plurality of support structures that structurally couple an outer container to an inner container. FIG. 5B is a first cross-sectional bottom plan view of the illustrative continuous APP airbag 500 along section line 5B-5B shown in FIG. 5A. FIG. 5C is a second cross-sectional bottom plan view of the illustrative continuous APP airbag 500 along section line 5C-5C shown in FIG. 5A. The continuous APP airbag 500 is shown as inflated with a gas, such as air. The continuous APP airbag 500 includes an inner cavity 502 which is configured to secure or contain a package, such as the package 108 discussed with reference to FIG. 1. The inner cavity 502 may be defined inner surfaces 504 of the continuous APP airbag 500, shown in FIG. 5C. The APP continuous airbag 500 may form a pressure vessel configured to receive air from a filling orifice and maintain the air, at least temporarily based on design requirements.

In some embodiments, the APP continuous airbag 500 may include support structures 508 that couple the inner surface 504 to an outer surface 506 of the continuous APP airbag 500 while enabling airflow throughout the continuous APP airbag 500. The support structures 508, may be biasing structures, malleable rods or other types of structures, which may be formed of the same material as the continuous APP airbag 500 (e.g., polyethylene, etc.) or of a different material, and act to maintain a gap 507 having a width between the inner surface 504 and the outer surface 506, as shown in FIG. 5C. The support structures 508 may be projected in different directions to counteract one another and prevent some deformation of the airbag upon impact with the ground. The support structures 508 may form a biasing device, and thus may be formed of a material or configuration that enables flexing, elongation, and/or other controlled or predictable movement between the outer surface 504 and the inner surface 506. The support structure 508 may absorb energy when the package 108 contacts the ground after being dropped from the air, thus dissipating energy and preventing damage to the package 108.

In use, the continuous APP airbag 500 may operate more like a conventional bag or container. A top of the continuous APP airbag 500 may include a flap 510, or other feature to enable insertion of the package into the inner cavity 302 without puncturing the continuous APP airbag 500. For example, a compartment may separate from an adjacent compartment to enable insertion of the package. Once the package is stowed inside the continuous APP airbag 500, the flap 510 may be closed by hook and loop closures, adhesive, tap, and/or any other coupling feature.

As shown in both FIGS. 5A and 5B, the continuous APP airbag 500 may include a filling orifice 512, which may be closed by the sealing feature 514. The sealing feature 514 may be a seal created by use a heat sealer (e.g., resulting in melted polyethylene, etc.), an adhesive (e.g., glue, tape, etc.), an elastic constriction band (e.g., a rubber band, etc.), and/or other sealing features to at least partially close the filling orifice of the continuous APP airbag 500.

The continuous APP airbag 500, during inflation, may enable air (or any other gas) to flow through the continuous APP airbag 500. The width of the gap 507 of the continuous APP airbag 500 may be based on the size and weight of a package to be placed in the inner cavity 502 and a maximum distance the package is expected to be dropped. The continuous APP airbag 500 may, upon impact, cause air near a side of the impact to move to another portion of the continuous APP airbag 500, while causing deflection of some of the support structures 508, thereby absorbing some of the impact of the ground and reducing deceleration of the package contained in the inner cavity 502. In some embodiments, the continuous APP airbag 500 may bulge upon impact and/or release air through the filling orifice 512 and/or other apertures to increase absorption of the energy caused by impacting the ground, similar to the way a stunt airbag dissipates energy when a person lands on it.

In some embodiments, the APP airbag may include coupling features to couple to the securing mechanisms 210 shown in FIG. 2A. The coupling features may include loops or other features that enable the UAV to secure couple to the cargo.

Figure 6A:
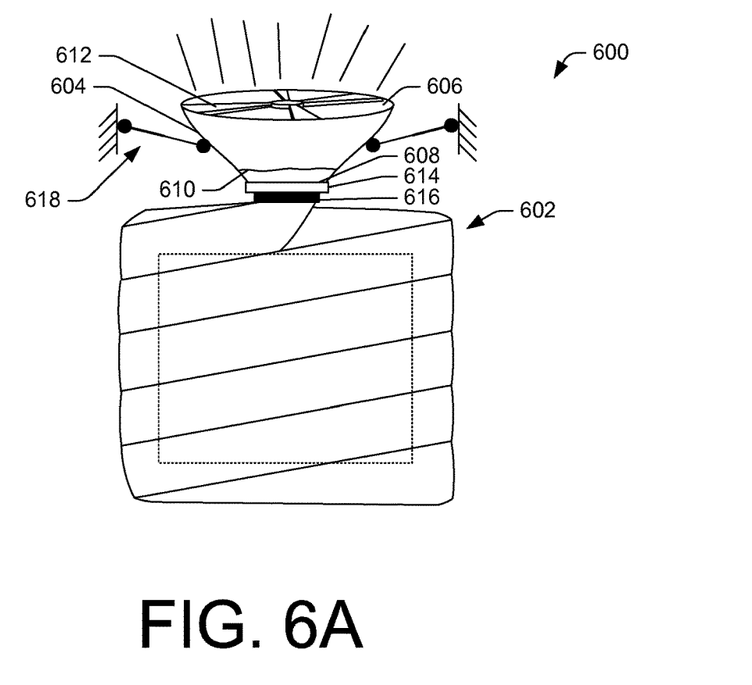
FIGS. 6A-6C show side elevation view of various inflation apparatus used to inflate an airbag.

FIG. 6A is a side elevation view of a funnel inflation apparatus 600 used to inflate the APP airbag. The funnel inflation apparatus 600 may be used to inflate an APP airbag 602, such as any one of the APP airbags discussed herein. The funnel inflation apparatus 600 may include a funnel 604 that directs airflow from a larger aperture 606 to a smaller aperture 608 and into the filling orifice 610 of the APP airbag 602. The airflow may be generated by a rotor 612, which may be one of the propulsion units 204 of the UAV 200 shown and discussed with reference to FIG. 2A. Thus, the funnel inflation apparatus 600 may direct downdraft from one or more of the propulsion units into the funnel to inflate the APP airbag 602. In some embodiments, the rotor 612 may be implemented as a dedicated fan for use with the funnel inflation apparatus 600, and thus be separate from the propulsion units of the UAV.

In some embodiments, the funnel inflation apparatus 600 may include a valve 614 to selectively allow or prevent airflow into or out from the APP airbag 602. For example, the valve may be closed until the APP airbag is ready to be filled with air, at which point the valve may be opened to allow downdraft from the propulsion units to fill the APP airbag 602 with air. The value 614 may be a one-directional valve that allows airflow into the APP airbag 602 and inhibits deflation of the APP airbag 602. A coupler 616 may be used to couple the APP airbag 602 to the funnel inflation apparatus 600. The coupler 616 may be an elastic constriction band (e.g., rubber band, etc.), a clamp, or any other type of coupling device.

In various embodiments, a movement mechanism 618 may be used to position the funnel inflation apparatus 600 under or proximate to one or more propulsion units so that the downdraft from the propulsion unit(s) is directed into the funnel inflation apparatus 600 via the larger aperture 606. The movement mechanism 618 may be coupled to the UAV, such as in a cargo bay of the UAV, and move the funnel inflation apparatus 600 toward or away from downdraft of the propulsion units, for example.

In some embodiments, at least a portion of the funnel inflation apparatus 600 may be coupled to the APP airbag and intended to be dropped with the package at the destination. For example, the funnel 604 may be attached to the airbag and dropped with the package at the destination.

Figure 6B:
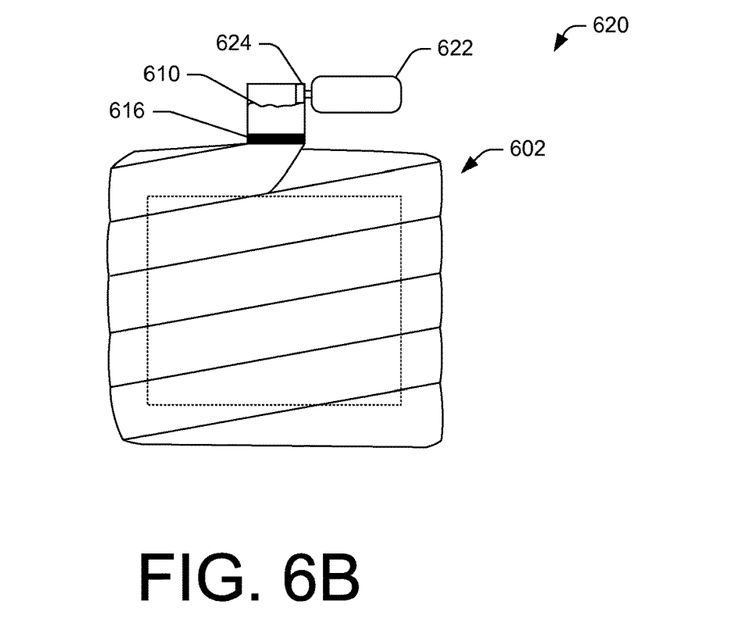

FIG. 6B is a side elevation view of an inflation apparatus 620 used to inflate the APP airbag. The inflation apparatus 620 may use compressed gas to fill the APP airbag. For example, the compressed gas may be stored in a cylinder 622, such as a small version of a scuba tank or a $CO_2$ cylinder, typically used to inflate bicycle tires. A valve 624 may regulate flow of air or gas from the cylinder. The inflation apparatus 620 may include the coupler 616. The APP airbag 602 may include the filler orifice 610, which receive the inflow of air or gas from the inflation apparatus 620.

Figure 6C:
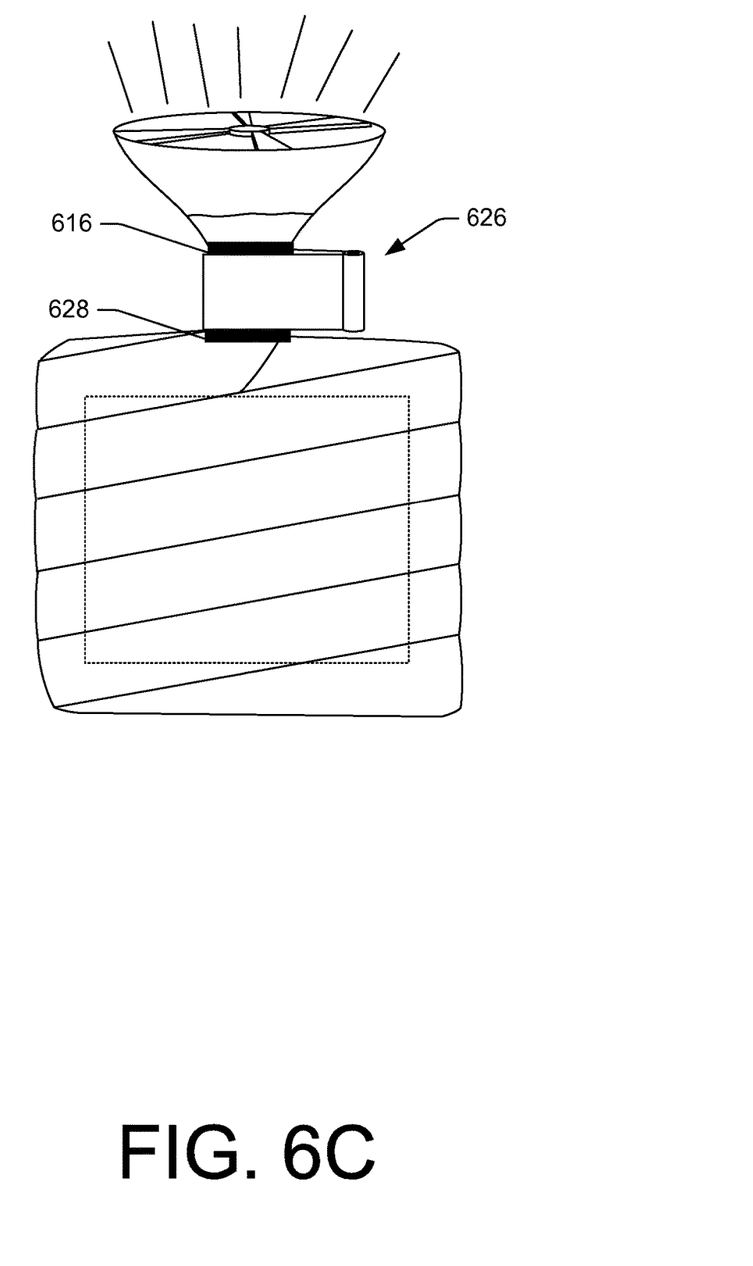

FIG. 6C is a side elevation view of a clamping inflation apparatus 626 used to increase an amount of air or gas enclosed in the APP airbag. The clamping inflation apparatus 626 may cause an actuator to clamp at least a portion of the APP airbag 602, thereby compressing the portion and causing the gas (e.g., air) from within the portion to be relocated to another portion of the APP airbag 602. By clamping the portion of the airbag, the remaining portion of the APP airbag 602 may experience a higher pressurization and/or may receive more air or gas. After the clamping, a sealing mechanism may seal the APP airbag 602 at a location 628, excluding the clamped portion, to maintain the air in the remaining portion of the APP airbag 602. The coupler 616 may be used to seal the APP airbag 602 prior to the clamping. The clamping inflation apparatus 626 may be used with any of the inflation techniques described herein.

While FIGS. 6A-6C depict an APP airbag similar to the helical APP airbag 300, it should be understood by those having ordinary skill any of the APP airbags discussed herein may be used or adapted to be used with any combination of the inflation apparatuses.

Figure 7A:
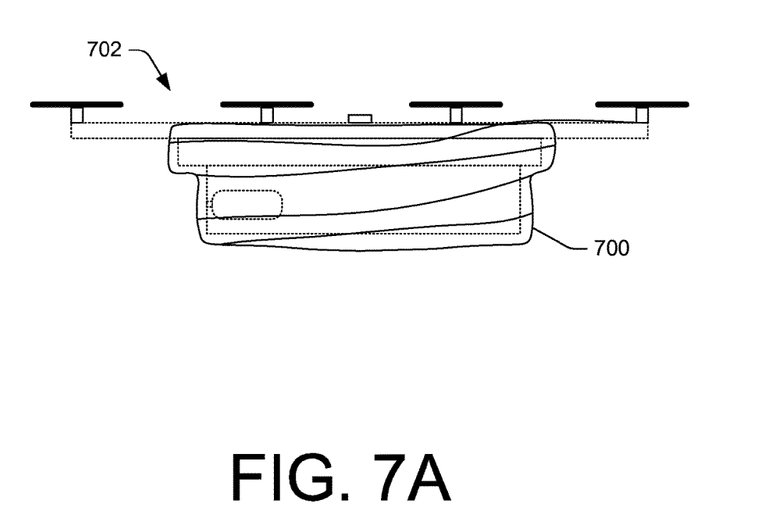
FIGS. 7A and 7B are side elevation views of an illustrative UAV airbag.
Figure 7B:
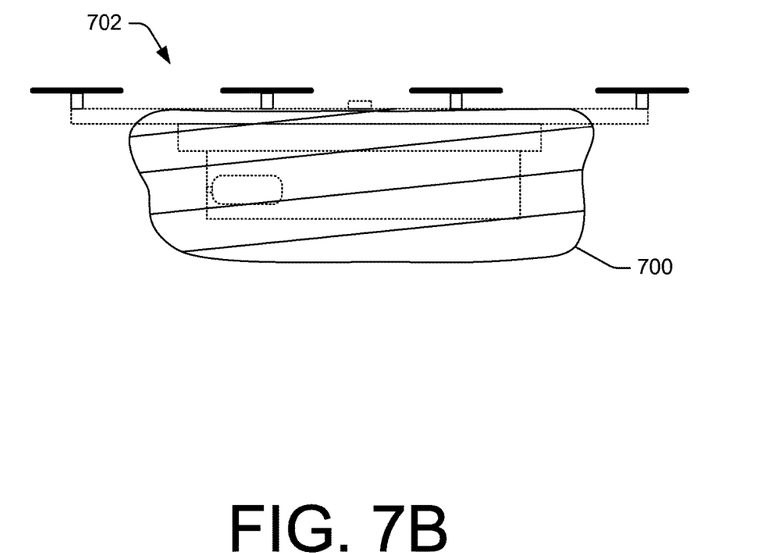

FIGS. 7A and 7B are side elevation views of an illustrative UAV airbag 700. FIG. 7A shows a UAV 702 with the UAV airbag 700 prior to inflation. The UAV airbag 700 may be formed using any of the configurations described above for the APP airbag, including any combination of inflation techniques. The UAV 702 may be preconfigured with the UAV airbag 700 before flight. The UAV airbag 700 may be inflated in various situations, such as after the UAV becomes unresponsive to controls, experiences power failure, and/or at other times. The UAV airbag 700 may be filled by compressed air or compressed gas in some embodiments, which may inflate the UAV airbag automatically in response to a trigging event, such as a power failure or loss of control signals for a threshold amount of time.

FIG. 7B shows the UAV airbag 700 after inflation. In accordance with one or more embodiments, the UAV airbag 700 may be configured to avoid obstructing control features and propulsion units of the UAV so that the UAV 702 may regain flight or control even after the UAV airbag is inflated.

Figure 8:
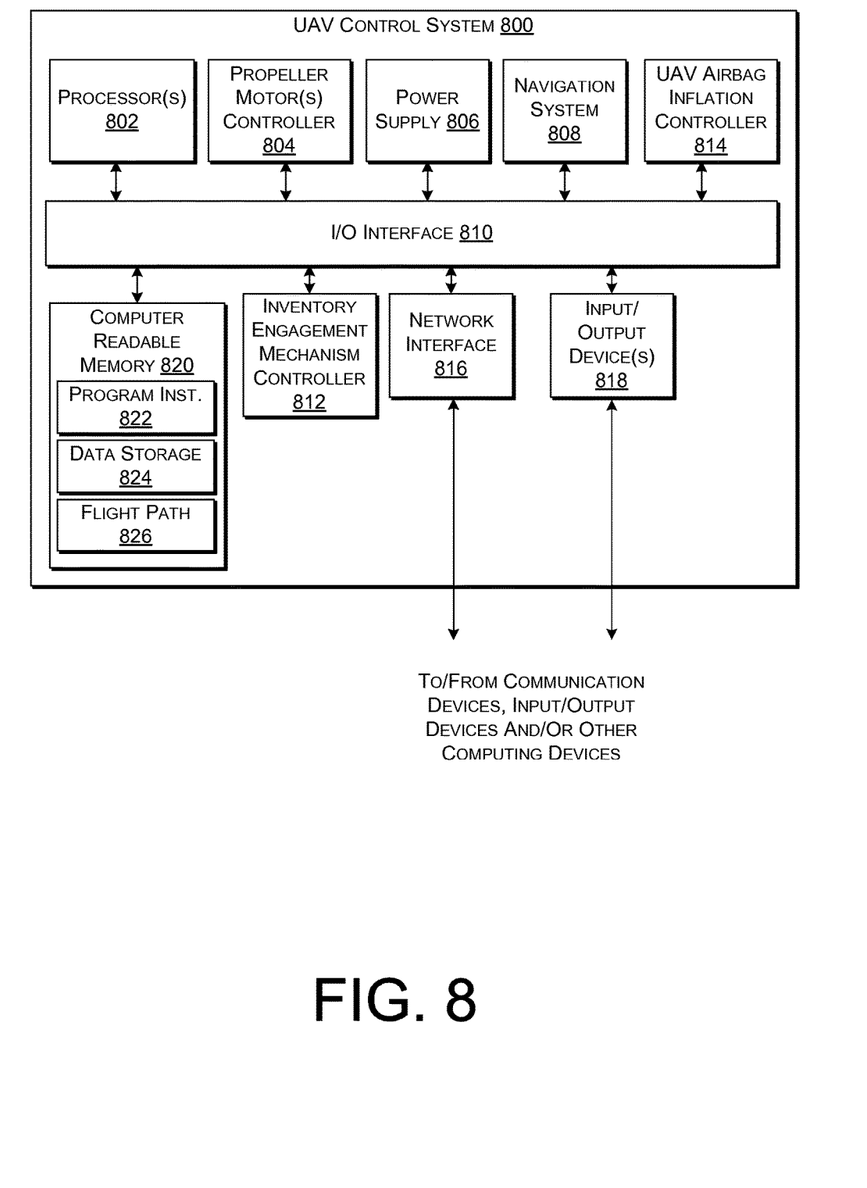
FIG. 8 is a block diagram of an illustrative control system of the UAV.

FIG. 8 is a block diagram of an illustrative control system 800 of the UAV. In various examples, the block diagram may be illustrative of one or more aspects of the UAV control system 800 that may be used to implement the various systems, devices, and techniques discussed above. In the illustrated implementation, the UAV control system 800 includes one or more processors 802, coupled to a non-transitory computer readable storage medium 820 via an input/output (I/O) interface 810. The UAV control system 800 may also include a propeller motor controller 804, power supply module 806 and/or a navigation system 808. The UAV control system 800 further includes an inventory engagement mechanism controller 812, a UAV airbag inflation controller 814, a network interface 816, and one or more input/output devices 818.

In various implementations, the UAV control system 800 may be a uniprocessor system including one processor 802, or a multiprocessor system including several processors 802 (e.g., two, four, eight, or another suitable number). The processor(s) 802 may be any suitable processor capable of executing instructions. For example, in various implementations, the processor(s) 802 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 802 may commonly, but not necessarily, implement the same ISA.

The non-transitory computer readable storage medium 820 may be configured to store executable instructions, data, flight paths, and/or data items accessible by the processor(s) 802. In various implementations, the non-transitory computer readable storage medium 820 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 820 as program instructions 822, data storage 824 and flight path data 826, respectively. In other implementations, program instructions, data and/or flight paths may be received, sent or stored upon different types of computer-accessible media, such as non-transitory media, or on similar media separate from the non-transitory computer readable storage medium 820 or the UAV control system 800. Generally speaking, a non-transitory, computer readable storage medium may include storage media or memory media such as flash memory (e.g., solid state memory), magnetic or optical media (e.g., disk) coupled to the UAV control system 800 via the I/O interface 810. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 816.

In one implementation, the I/O interface 810 may be configured to coordinate I/O traffic between the processor(s) 802, the non-transitory computer readable storage medium 820, and any peripheral devices, the network interface or other peripheral interfaces, such as input/output devices 818. In some implementations, the I/O interface 810 may perform any necessary protocol, timing or other data transformations to convert data signals from one component (e.g., non-transitory computer readable storage medium 820) into a format suitable for use by another component (e.g., processor(s) 802). In some implementations, the I/O interface 810 may include support for devices attached through various types of peripheral buses, such as a variant of the Peripheral Component Interconnect (PCI) bus standard or the Universal Serial Bus (USB) standard, for example. In some implementations, the function of the I/O interface 810 may be split into two or more separate components, such as a north bridge and a south bridge, for example. Also, in some implementations, some or all of the functionality of the I/O interface 810, such as an interface to the non-transitory computer readable storage medium 820, may be incorporated directly into the processor(s) 802.

The propeller motor(s) controller 804 communicates with the navigation system 808 and adjusts the power of each propeller motor to guide the UAV along a determined flight path. The power supply module 806 may control the charging and any switching functions associated with one or more power modules (e.g., batteries) of the UAV, such as the power sources 614, 714.

The navigation system 808 may include a GPS or other similar system that can be used to navigate the UAV to and/or from a location. The inventory engagement mechanism controller 812 communicates with the actuator(s) or motor(s) (e.g., a servo motor) used to engage and/or disengage inventory. For example, when the UAV is positioned over a level surface at a delivery location, the inventory engagement mechanism controller 812 may provide an instruction to a motor that controls the inventory engagement mechanism to release the inventory.

The UAV airbag inflation controller 814 may operate to cause the UAV airbag 700 to be inflated with air or gas in response to a triggering event. The triggering event may be a loss of control signals, a power failure, and/or other events.

The network interface 816 may be configured to allow data to be exchanged between the UAV control system 800, other devices attached to a network, such as other computer systems, and/or with UAV control systems of other UAVs. For example, the network interface 816 may enable wireless communication between numerous UAVs. In various implementations, the network interface 816 may support communication via wireless general data networks, such as a Wi-Fi network. For example, the network interface 816 may support communication via telecommunications networks such as cellular communication networks, satellite networks, and the like.

Input/output devices 818 may, in some implementations, include one or more displays, image capture devices, thermal sensors, infrared sensors, time of flight sensors, accelerometers, pressure sensors, weather sensors, airflow sensors, etc. Multiple input/output devices 818 may be present and controlled by the UAV control system 800. One or more of these sensors may be utilized to assist in landings as well as avoiding obstacles during flight.

As shown in FIG. 8, the memory may include program instructions 822 which may be configured to implement the example processes and/or sub-processes described above. The data storage 824 may include various data stores for maintaining data items that may be provided for determining flight paths, retrieving inventory, landing, identifying a level surface for disengaging inventory, causing movement of ballast, etc.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV control system 800 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The UAV control system 800 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV control system 800. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the UAV control system 800 may be transmitted to the UAV control system 800 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium. Accordingly, the techniques described herein may be practiced with other UAV control system configurations.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A container configured to protect an item during transport to a destination, the container comprising:
   an inflatable portion that includes inflatable sidewalls that connect an inflatable cover to an inflatable base, at least the inflatable sidewalls formed from an elongated tubular inflatable vessel arranged as a helix defining a non-pressurized internal cavity to secure the item therewithin, the elongated tubular inflatable vessel having a filling orifice to inflate the inflatable sidewalls, the inflatable cover, and the inflatable base with gas; and
   two or more apertures through the inflatable cover that enable coupling arms to couple to the item in the non-pressurized internal cavity during transport while the elongated tubular inflatable vessel is inflated.

2. The container as recited in claim 1, further comprising a valve coupled to the filling orifice to allow the inflow of gas into the elongated tubular inflatable vessel and to inhibit deflation of the elongated tubular inflatable vessel.

3. The container as recited in claim 1, further comprising coupling features coupled to the inflatable sidewalls to enable secure transport of the container.

4. The container as recited in claim 1, wherein the elongated tubular inflatable vessel includes a first end section that is arranged as a first coil to create the inflatable base that defines a bottom side of the inflatable base.

5. The container as recited in claim 4, wherein the elongated tubular inflatable vessel includes a second end section that is arranged to form the inflatable cover, the inflatable cover configured to at least partially separate from the inflatable sidewalls to enable access to the non-pressurized internal cavity prior to sealing the inflatable cover to the inflatable sidewalls.

6. The container as recited in claim 1, further comprising a sealing mechanism to seal the filling orifice after inflation of the elongated tubular inflatable vessel, the sealing mechanism being at least one of an elastic constriction band, adhesive, or a heat sealed feature that inhibits deflation of the elongated tubular inflatable vessel.

7. An apparatus comprising:
   an inflatable portion that includes sidewalls extending between a cover and a base;
   an orifice configured to receive gas to inflate at least one of the sidewalls, the cover, and the base to an inflation pressure;
   an inner cavity defined within the sidewalls, the cover, and the base, the inner cavity being unpressurized when the inflatable portion is at the inflation pressure, the base formed from at least an elongated inflatable tube that is coiled to define a bottom portion of the inner cavity,
   wherein the cover is configured to be at least partially separable from the sidewalls to enable insertion of an item in the inner cavity, the cover securable to the sidewalls to securely contain the item in the inner cavity; and
   two or more apertures through the inflatable portion that enable coupling arms to couple to the item in the inner cavity during transport while the inflatable portion is inflated.

8. The apparatus as recited in claim 7, wherein the sidewalls are formed from at least one elongated tube that is helically arranged to define the inner cavity.

9. The apparatus as recited in claim 8, wherein the internal cavity is generally shaped as a cylindrical volume.

10. The apparatus as recited in claim 7, wherein the internal cavity is generally shaped as a rectangular volume.

11. The apparatus as recited in claim 7, wherein the sidewalls, cover, and base are integrally formed from a same material.

12. The apparatus as recited in claim 7, further comprising coupling features on the sidewalls to enable secure transport of the airbag container.

13. The apparatus as recited in claim 7, further comprising a valve located within the orifice to enable inflow of gas into the inflatable portion and at least partially restrict outflow of gas from the inflatable portion.

14. The apparatus as recited in claim 7, wherein the cover is at least partially secured to the sidewalls by at least one of hooks and loops, adhesive, or snap-fit couplers.

15. An inflatable container comprising:
   inflatable sidewalls that connect an inflatable cover to an inflatable base, the inflatable sidewalls and inflatable base defining a non-pressurized inner cavity configured to secure an item, the inflatable sidewalls formed by a helical structure comprising an elongated tubular pressure vessel arranged as a helix of adjacent coils wrapping around at least a portion of the non-pressurized inner cavity to define an outer boundary of the non-pressurized inner cavity; and
   two or more apertures through the inflatable cover that enable coupling arms to couple to the item in the non-pressurized inner cavity during transport while the elongated tubular pressure vessel is inflated.

16. The inflatable container as recited in claim 15, wherein the inflatable cover is configured to secure the item within the non-pressurized inner cavity.

17. The inflatable container as recited in claim 15, further comprising a plurality of apertures through the elongated tubular pressure vessel that release air upon an impact to the inflatable container.

* * * * *

UNITED STATES PATENT AND TRADEMARK OFFICE
CERTIFICATE OF CORRECTION

PATENT NO. : 10,137,986 B1
APPLICATION NO. : 14/668821
DATED : November 27, 2018
INVENTOR(S) : Avi Bar-Zeev et al.

Page 1 of 1

It is certified that error appears in the above-identified patent and that said Letters Patent is hereby corrected as shown below:

In the Claims

Column 13 Claim 2, Line 24, change "allow the inflow" to -- allow an inflow --.

Column 14 Claim 9, Line 16, change "internal" to -- inner --.

Column 14 Claim 10, Line 19, change "internal" to -- inner --.

Column 14 Claim 12, Line 25, change "airbag container" to -- apparatus --.

Signed and Sealed this
Twenty-sixth Day of March, 2019

Andrei Iancu
*Director of the United States Patent and Trademark Office*